(12) United States Patent
Mendonsa et al.

(10) Patent No.: US 12,001,594 B2
(45) Date of Patent: Jun. 4, 2024

(54) WIRELESS DATA STORAGE DEVICES AND SYSTEMS

(71) Applicant: Seagate Technology LLC, Fremont, CA (US)

(72) Inventors: Riyan Alex Mendonsa, Edina, MN (US); Hongtao Zhu, Minneapolis, MN (US); Brett R Herdendorf, Mound, MN (US); Jon D Trantham, Chanhassen, MN (US); Krishnan Subramanian, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 567 days.

(21) Appl. No.: 17/232,380

(22) Filed: Apr. 16, 2021

(65) Prior Publication Data
US 2022/0335166 A1   Oct. 20, 2022

(51) Int. Cl.
*G11B 17/30* (2006.01)
*G05B 15/02* (2006.01)
(Continued)

(52) U.S. Cl.
CPC ............ *G06F 21/78* (2013.01); *G05B 15/02* (2013.01); *G06F 3/0604* (2013.01);
(Continued)

(58) Field of Classification Search
CPC ...... G06F 21/78; G06F 3/0604; G06F 3/0659; G06F 3/0673; G06F 13/1668;
(Continued)

(56) References Cited

U.S. PATENT DOCUMENTS 6,801,834 B1 * 10/2004 Konshak .............. G11B 17/225
                                                                 710/316
6,968,459 B1    11/2005 Morgan et al.
(Continued)

FOREIGN PATENT DOCUMENTS

CN          111742315 A      10/2020
EP           2684331 B1       4/2020
(Continued)

OTHER PUBLICATIONS

Alexander, J. et al., "New realms of measurement, connected data silos, and more in 2020 (Reader Forum)", RCR Wireless News, Retrieved from https://www.rcrwireless.com/20200310/opinion/new-realms-of-measurement- connected-data-silos-and-more-in-2020-reader-forum, dated Mar. 10, 2020.*
(Continued)

*Primary Examiner* — William J Klimowicz
(74) *Attorney, Agent, or Firm* — Westman, Champlin & Koehler, P.A.

(57) ABSTRACT

A data storage chassis includes a plurality of data storage cartridges, and printed circuit board assembly (PCBA) electronics selectively connectable to one or more of the plurality of data storage cartridges. The data storage chassis also includes a wireless interface controller communicatively coupled to the PCBA electronics. The wireless interface controller facilitates wireless communication of data between the data storage chassis and a host using at least one frequency in a range of frequencies including fifth-generation (5G), millimeter, and sub-millimeter frequency ranges.

7 Claims, 12 Drawing Sheets

(51) Int. Cl.
  *G06F 3/06* (2006.01)
  *G06F 13/16* (2006.01)
  *G06F 21/78* (2013.01)
  *H05K 7/14* (2006.01)
(52) U.S. Cl.
  CPC .......... *G06F 3/0659* (2013.01); *G06F 3/0673* (2013.01); *G06F 13/1668* (2013.01); *H05K 7/1427* (2013.01)
(58) Field of Classification Search
  CPC ....... G06F 3/061; G06F 3/0683; G05B 15/02; H05K 7/1427; G11B 17/30; G11B 33/126; G11B 33/128
  See application file for complete search history.

(56) References Cited

U.S. PATENT DOCUMENTS

| | | | |
|---|---|---|---|
| 7,454,529 | B2 | 11/2008 | Stager et al. |
| 8,468,244 | B2 | 6/2013 | Redlich et al. |
| 8,984,275 | B2 | 3/2015 | Ozgit |
| 9,071,446 | B2 | 6/2015 | Kreft |
| 9,235,020 | B2 * | 1/2016 | Pitwon ..................... G02B 6/43 |
| 9,235,724 | B2 | 1/2016 | Mevec et al. |
| 9,361,046 | B1 * | 6/2016 | Martin ..................... G06F 3/067 |
| 9,461,826 | B2 | 10/2016 | Kreft |
| 9,832,222 | B2 | 11/2017 | Hutton |
| 9,893,898 | B2 | 2/2018 | Kreft |
| 10,171,251 | B2 | 1/2019 | Kreft |
| 10,242,234 | B2 | 3/2019 | Allo |
| 10,318,734 | B2 | 6/2019 | Young et al. |
| 10,398,060 | B1 | 8/2019 | Beall et al. |
| 10,419,131 | B2 | 9/2019 | Westmeyer et al. |
| 10,491,467 | B2 | 11/2019 | Wittenschlaeger et al. |
| 10,534,417 | B2 | 1/2020 | Ortega Gutierrez et al. |
| 10,536,846 | B1 | 1/2020 | Hennessy et al. |
| 10,615,989 | B2 | 4/2020 | Kreft |
| 10,742,493 | B1 | 8/2020 | Kay et al. |
| 10,803,206 | B2 | 10/2020 | Allo |
| 10,818,318 | B2 * | 10/2020 | Herdendorf .......... G11B 15/682 |
| 10,819,944 | B2 | 10/2020 | Buddhavaram et al. |
| 10,834,688 | B1 | 11/2020 | Gan et al. |
| 11,308,990 | B1 * | 4/2022 | Mendonsa ........... H05K 5/0256 |
| 11,367,464 | B2 * | 6/2022 | Herdendorf .......... G11B 33/128 |
| 11,481,521 | B2 | 10/2022 | Soffer |
| 2003/0235000 | A1 * | 12/2003 | Takayama ............... G11B 27/11 |
| 2006/0072241 | A1 * | 4/2006 | Feliss ........................ G06F 1/20 |
| | | | 361/679.33 |
| 2007/0088981 | A1 | 4/2007 | Noble et al. |
| 2010/0185846 | A1 | 7/2010 | Fukase |
| 2010/0250497 | A1 | 9/2010 | Redlich et al. |
| 2011/0150489 | A1 | 6/2011 | Davidson et al. |
| 2011/0243074 | A1 | 10/2011 | Shin et al. |
| 2014/0108786 | A1 | 4/2014 | Kreft |
| 2014/0156719 | A1 | 6/2014 | Leggette et al. |
| 2014/0189380 | A1 * | 7/2014 | Colpo ................... G06F 3/0644 |
| | | | 713/300 |
| 2014/0328562 | A1 * | 11/2014 | Pitwon ..................... G02B 6/43 |
| | | | 307/104 |
| 2015/0161415 | A1 | 6/2015 | Kreft |
| 2015/0363109 | A1 * | 12/2015 | Frick ..................... G06F 3/0634 |
| | | | 711/112 |
| 2016/0135318 | A1 | 5/2016 | Dean |
| 2016/0359635 | A1 | 12/2016 | Kreft |
| 2016/0359636 | A1 | 12/2016 | Kreft |
| 2017/0222945 | A1 | 8/2017 | Franca-Neto |
| 2019/0140852 | A1 | 5/2019 | Kreft |
| 2019/0168876 | A1 * | 6/2019 | Goodman ............... B60L 50/61 |
| 2020/0169860 | A1 | 5/2020 | Dowlatkhah et al. |
| 2020/0228351 | A1 | 7/2020 | Kreft |
| 2020/0285778 | A1 | 9/2020 | Soffer |
| 2020/0301619 | A1 * | 9/2020 | Mendonsa ............... G06F 1/187 |
| 2020/0302966 | A1 * | 9/2020 | Herdendorf ........... G11B 20/10 |
| 2021/0082467 | A1 * | 3/2021 | Herdendorf .......... G11B 33/126 |
| 2021/0240622 | A1 | 8/2021 | Lea |
| 2022/0035901 | A1 | 2/2022 | Yun |
| 2023/0032300 | A1 * | 2/2023 | Herdendorf ........ G05B 19/4155 |

FOREIGN PATENT DOCUMENTS

| | | |
|---|---|---|
| WO | 2017132133 A1 | 8/2017 |
| WO | 2020067660 A1 | 4/2020 |

OTHER PUBLICATIONS

Sohail, M. et al., "Redesign backup strategies for next-gen data centers", 2019 Dell Technologies Proven Professional Knowledge Sharing Article, dated 2018, 28 pages.
U.S. Appl. No. 17/161,523, filed Jan. 28, 2021, 27 pages.
Non-Final Office Action for U.S. Appl. No. 17/387,266, mailed Oct. 16, 2023, 20 pages.
"Gapwaves launches new 5G mmWave Phased Array Antenna", Press release from Gapwaves AB, retrieved from (cision.com), dated Feb. 10, 2020.

* cited by examiner

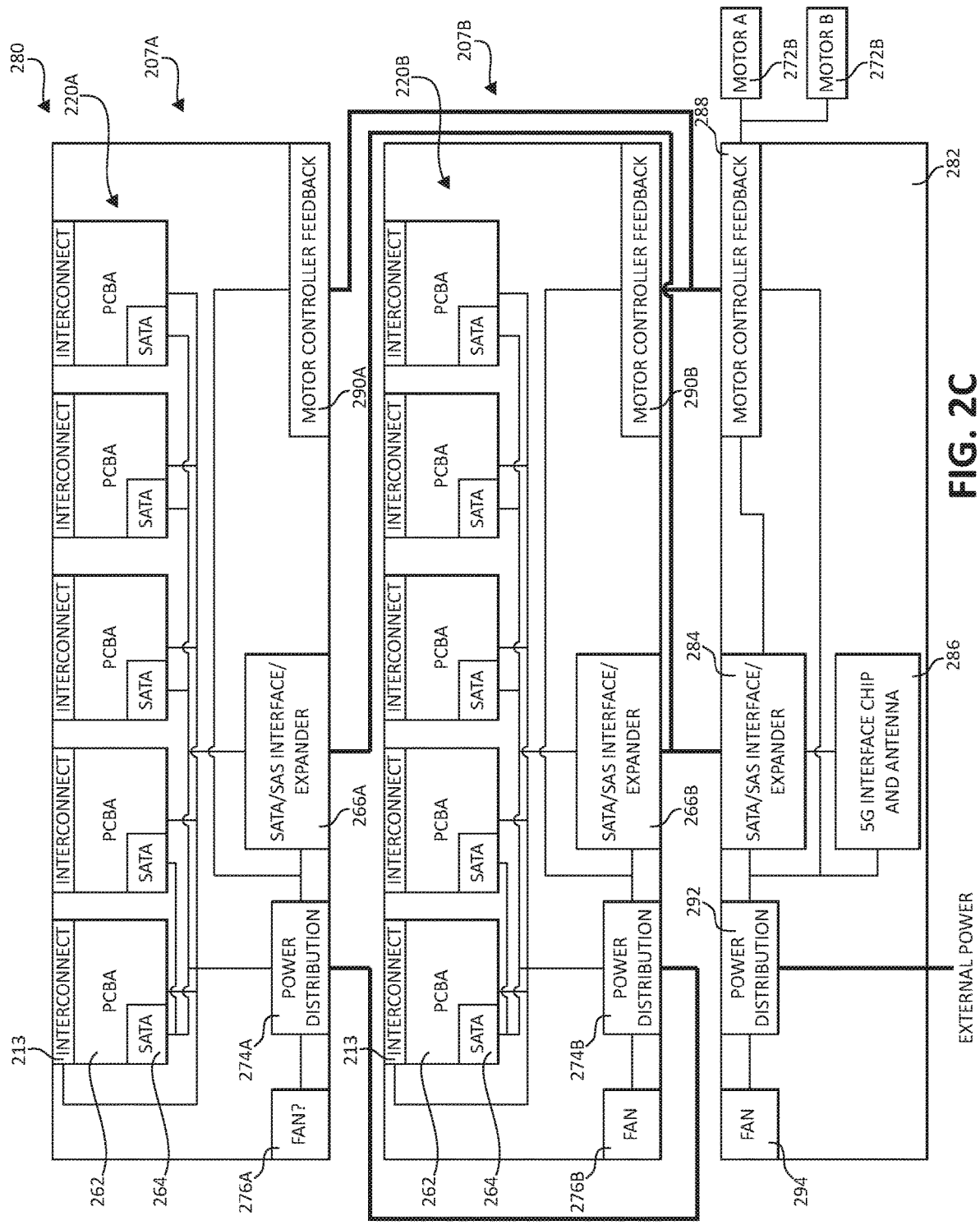

WIRELESS DATA STORAGE DEVICES AND SYSTEMS

SUMMARY

In one embodiment, a data storage chassis is provided. The data storage chassis includes a plurality of data storage cartridges, and a plurality of printed circuit board assemblies (PCBAs) that are detachably connectable to different subsets of the plurality of data storage cartridges by operation of a motor. The data storage chassis also includes a wireless interface controller communicatively coupled to the plurality of PCBAs, and communicatively coupled to a motor controller that is configured to activate the motor. The wireless interface controller is configured to provide the motor controller with movement control commands that cause the motor controller to responsively activate the motor to move the plurality of PCBAs in one or more directions dictated by the movement control commands. The wireless interface controller facilitates wireless communication of data between the data storage chassis and a host using at least one frequency in a range of frequencies including fifth-generation (5G), millimeter, and sub-millimeter frequency ranges.

In another embodiment, a data storage device is provided. The data storage device includes one or more data storage media, and a drive controller communicatively coupled to the one or more data storage media. The data storage device also includes a wireless interface controller communicatively coupled to the drive controller. The wireless interface controller facilitates wireless communication of data between the data storage device and a host using at least one frequency in a range of frequencies including fifth-generation (5G), millimeter, and sub-millimeter frequency ranges.

In yet another embodiment, a data storage chassis is provided. The data storage chassis includes a plurality of data storage cartridges, and read/write control and power electronics selectively connectable to one or more of the plurality of data storage cartridges. The data storage chassis also includes a wireless interface controller communicatively coupled to the read/write control and power electronics. The wireless interface controller facilitates wireless communication of data between the data storage chassis and a host using at least one frequency in a range of frequencies including fifth-generation (5G), millimeter, and sub-millimeter frequency ranges.

This summary is not intended to describe each disclosed embodiment or every implementation of the wireless data storage devices and systems. Many other novel advantages, features, and relationships will become apparent as this description proceeds. The figures and the description that follow more particularly exemplify illustrative embodiments.

BRIEF DESCRIPTION OF THE DRAWINGS

FIG. 2C is a simplified block diagram of a data storage chassis in accordance with another embodiment.

DETAILED DESCRIPTION

Figure 1:
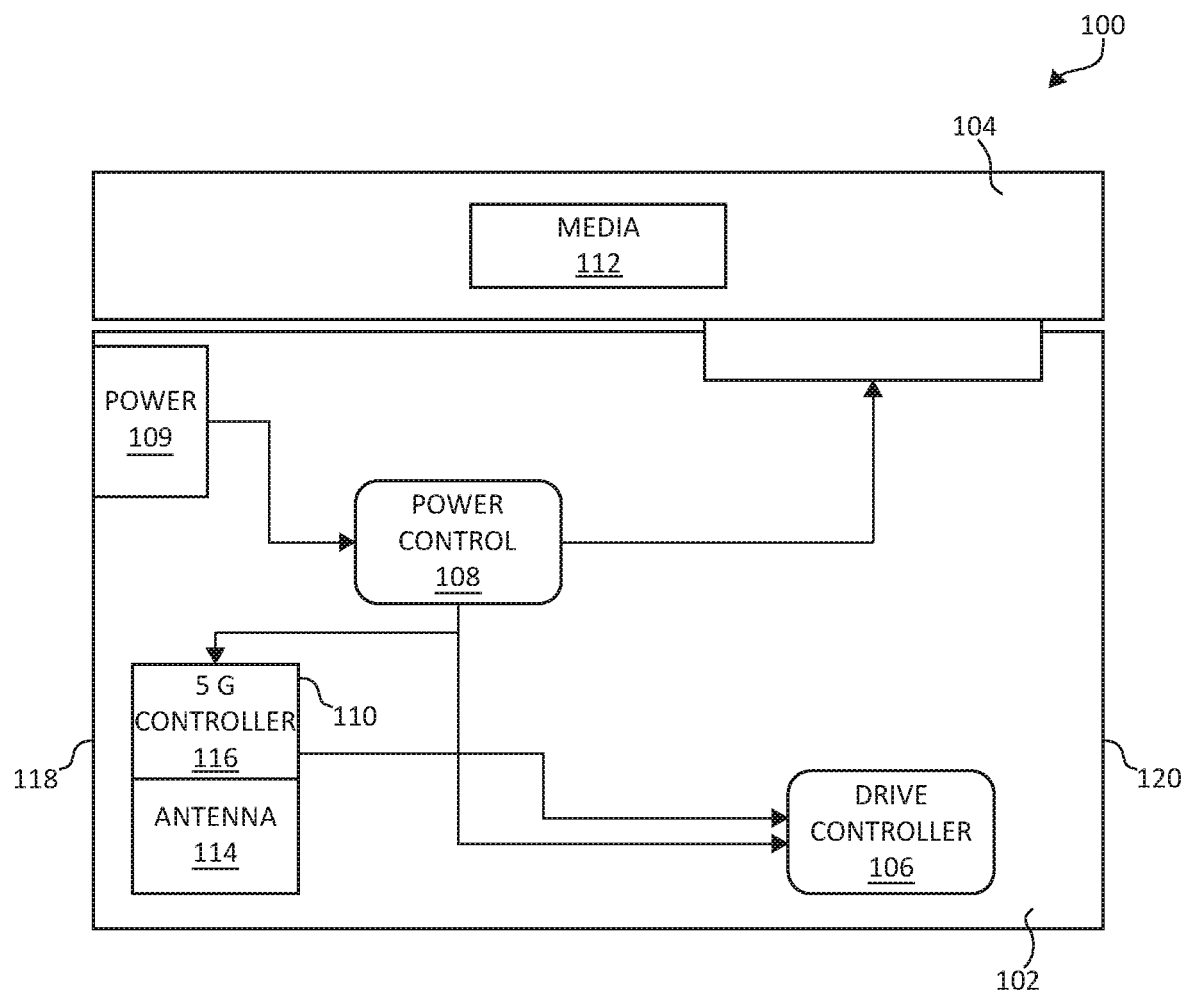
FIG. 1 is a block diagram of a data storage device that employs a high speed wireless communication interface in accordance with one embodiment.

Embodiments of the disclosure relate to data storage devices (e.g., hard disc drives (HDDs)) and data center racks/chassis that are capable of wireless communication. In different embodiments, the data storage devices and the data center racks may employ fifth-generation (5G) telecommunication technologies, wireless millimeter wave and/or wireless sub-millimeter wave technologies (e.g., WiFi6) to carry out the wireless communication.

Issues with cabling and connectivity are the bane of current data centers and a limiting factor to the adoption of edge-based storage and computing as well as the implementation of Internet of Things (IoT). In a data storage chassis, the cost of connections to each data storage device is also a factor to consider, and reducing this cost can significantly reduce cost/slot for the chassis.

By attaching a wireless system such as a 5G, wireless millimeter wave, or wireless sub-millimeter system to an HDD and/or at higher levels (e.g., chassis), cabling can be eliminated, and the focus may be on connectivity and functionality. 5G and today's wireless connections have the following salient features:

Ability to maintain data speeds similar to or slightly higher than the throughput of today's HDDs.

Ability to connect with multiple devices simultaneously, and for a single hub to connect to multiple devices.

Accordingly, in one embodiment, a wireless interface controller and an antenna (e.g., a 5G, millimeter wave, or sub-millimeter wave antenna) are employed (instead of an interface for a wired connection) in a data storage device (e.g., an HDD). The wireless interface controller and antenna receive power from power control circuitry in the data storage device, and the wireless interface controller is coupled to data storage and retrieval control circuitry in the data storage device. In another embodiment, a data center chassis employs 5G or other high speed wireless communication to reduce cabling. In general, in embodiments of the disclosure, a single data storage device, a cluster of two or more data storage devices, and/or a data center chassis may employ 5G or other high speed wireless communication. Details regarding the different embodiments are provided further below.

It should be noted that like reference numerals are sometimes used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a block diagram of a data storage device 100 that employs a wireless communication interface in accordance with one embodiment. In a particular embodiment, data storage device 100 may be an HDD. Data storage device 100 may include a logic board (e.g., a printed circuit board assembly (PCBA)) 102 and a data storage assembly/cartridge (e.g., a head disc assembly (HDA)) 104. Logic board 102 includes a drive controller 106, power control circuitry 108, a wired or wireless power interface 109 and a wireless communication interface 110 by which data may be received from and sent to a host (not shown). Data storage cartridge 104 may include data storage media 112 and other moving and/or non-moving components and circuitry, which are not shown and described in the interest of simplification.

Drive controller 106 may be implemented using one or more system on chip (SoC) and/or application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), discrete integrated circuits (ICs) and other Semi-Custom ICs, which may be programmed in any suitable manner. The functions of drive controller 106 may also be implemented—in whole or in part—with instructions embodied in memory formatted to be executed by one or more general and/or application-specific processors.

In some embodiments, wireless communication interface 110 may include an antenna (e.g., a 5G, millimeter wave, or sub-millimeter wave antenna) 114 and a wireless interface controller 116. In embodiments in which the data storage device 100 is an HDD and the PCBA 102 is affixed to a bottom of HDA 104, antenna 114 may be placed on a narrow end of the HDD 100 (e.g., proximate to edges 118, 120 of PCBA 102) or at any other suitable location to minimize shielding from adjacent HDDs when used in applications that employ multiple closely-positioned HDDs. In general, specific placement locations for the antenna 114 may vary depending upon how the drives (for example, HDDs) are mounted in a system. In some embodiments, wireless interface controller 116 may include one or more radios and/or transceiver circuits and any other suitable interface circuitry. The transceiver and other circuitry may be soldered to the circuit board of PCBA. Alternatively, an SoC may include both drive controller 106 and wireless interface controller 116.

As noted above, data storage cartridge 104 may include data storage media 112 and other moving and/or non-moving components and circuitry. In different embodiments, data storage media 112 may include one or more data storage discs (e.g., magnetic or optical data storage discs), Flash memory, or any combination thereof.

Power control circuitry 108 may receive power from wired or wireless power interface 109. Power control circuitry 108 controls power supplied to components of wireless communication interface 110, drive controller 106 and data storage assembly/cartridge 104, and may include voltage regulators, DC-DC converters, switches, fuses, etc.

During operation of data storage drive 100, drive controller 106 may process read and write requests in conjunction with the wireless communication interface 110. For example, a host (not shown) may wirelessly send data to data storage device 100 with a request to store that data. The driver controller 106 may process the request and store the received data in the data storage media 112. Also, the host may wirelessly send a request to data storage device 100 for data stored on the data storage media 112. In response, the drive controller 106 may retrieve the requested data, and the retrieved data may be wirelessly sent to the host by wireless communication interface 110. As indicated above, a high speed wireless connection has the ability to maintain data speeds similar to or slightly higher than the throughput of today's HDDs, and therefore a reduction in components is achieved without any reduction in drive performance. In addition to, or instead of, employing a high speed wireless communication in a single data storage drive such as 100, high speed wireless communication may also be employed in a data storage chassis to enable a communication unit of the chassis to wirelessly service commands from a host. An example environment including a data storage chassis in which high speed wireless communication may be used is described below in connection with FIG. 2A. Not shown, high speed wireless communication and control of the storage device may be authenticated and encrypted, e.g., via streaming cyphers, trusted platform modules (TPMs), etc., to prevent data loss or corruption.

Figure 2A:
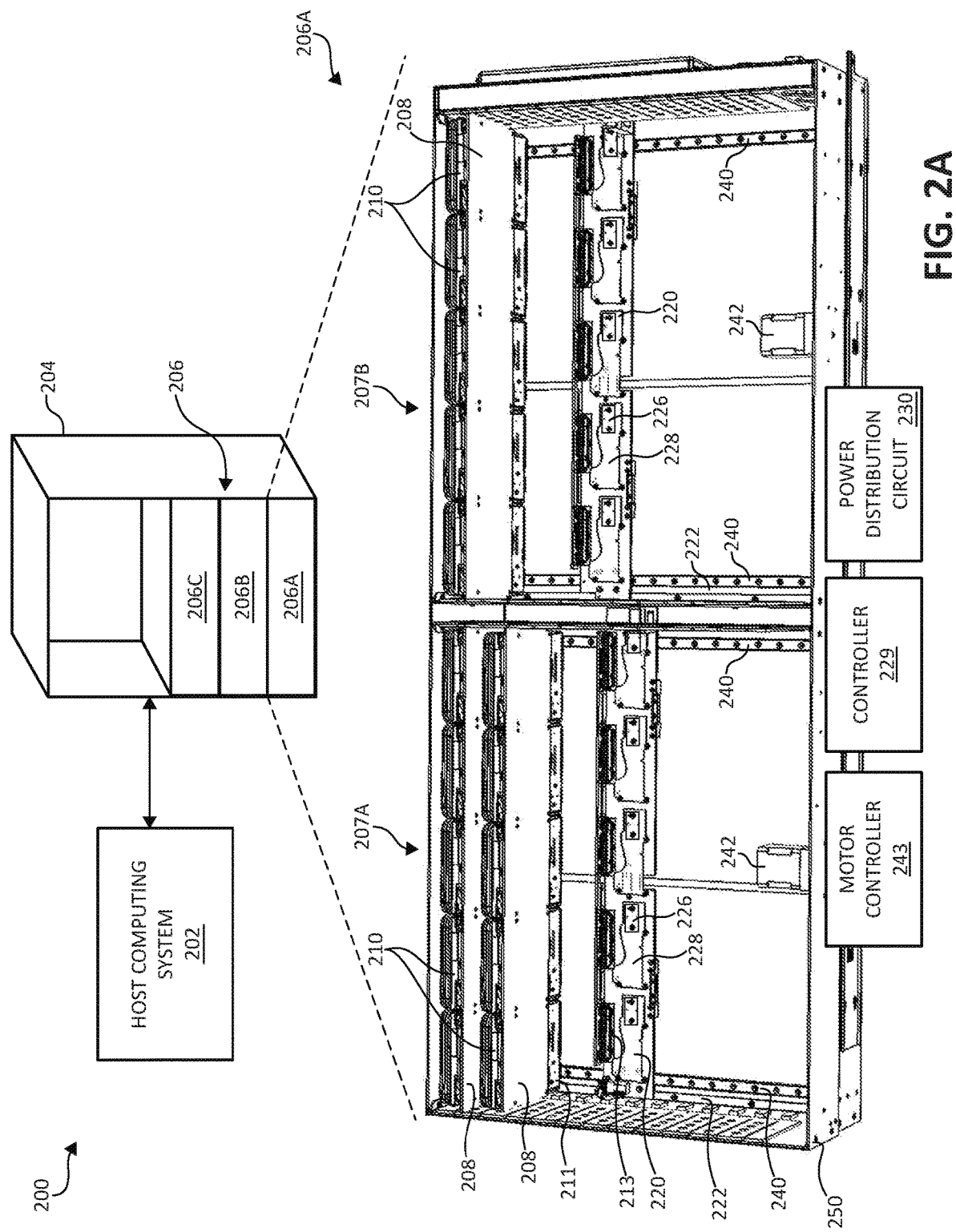
FIG. 2A illustrates an example data storage system in which high speed wireless communication may be employed in accordance with one or more embodiments.

FIG. 2A illustrates an example data storage system 200 in which high speed wireless communication may be employed in accordance with one or more aspects of the present disclosure. System 200 includes host computing system 202 and data storage rack 204.

Host computing system 202 represents any type of computing system that is configured to read data from and write data to one or more data storage devices. Examples of host computing system 202 include cloud computing environments, servers, desktop computers, laptop computers, mobile phones, tablet computers, televisions, automobiles, surveillance cameras, or any other type of mobile or non-mobile computing device that is configured to read and write data.

Data storage rack 204 includes a plurality of chassis 206A-206C (collectively, chassis 206). In some examples, each chassis 206 includes a housing 250 configured to slide in and out of a stowed position within data storage rack 204. In the example of FIG. 2A, chassis 206A is divided into a plurality of compartments 207A and 207B (collectively, compartments 207) that are each configured to store a plurality of data storage magazines 208. Chassis 206 may include more or fewer compartments 207. While chassis 206A is illustrated as storing two data storage magazines 208 in the first compartment 207A and one data storage magazine 208 in the second compartment 207B, chassis 206A may be configured to store any number of data storage magazines (e.g., 10, 15, 20, or more data storage magazines within each compartment 207). In some examples, data storage magazines 208 are configured to be insertable into, and removable from, housing 250 of chassis 206A. In one example, data storage magazines 208 are fixed within (e.g., integral with) the housing 250 of chassis 206A. Data storage magazines 208 may include metal (e.g., aluminum, stainless steel, or other metal), printed circuit board (PCB), and/or other rigid material. Each data storage magazine 208 is configured to hold or support a plurality of data storage cartridges 210 (similar to data storage cartridge 104 of FIG. 1). While FIG. 2A illustrates data storage magazines 208 supporting data storage cartridges 210 in rows, in some examples data storage magazines 208 may hold data storage cartridges 210 in different orientations or configurations. In some examples, chassis 206A is configured to store individual data storage cartridges 210. Chassis 206B and 206C may be configured the same or differently from each other and from chassis 206A.

Data storage cartridges 210 store data, such as data received from host computing system 202. Data storage cartridges 210 may include data storage media such as data storage discs, solid-state memory and/or magnetic tapes, among others. Each data storage cartridge 210 includes a drive interconnect 211 configured to physically and communicatively couple the respective data storage cartridge 210 to a corresponding carriage interconnect 213 of a carriage 220 (described further below). In the example of FIG. 2A, drive interconnects 211 and carriage interconnects 213 are configured to communicatively couple data storage cartridges 210 and a carriage 220 via an interface, such as a serial advanced technology attachment (SATA) interface, a serial attached small computer system interface (SAS), a peripheral component interconnect express (PCIe) interface, a universal serial bus ("USB") interface, or any other type of interface suitable for data storage communication. The interface may comprise a plurality of data communication interfaces, such as dual-ported SAS or multiple PCIe links, for example to provide redundancy or to improve performance.

As noted above, chassis 206A includes housing 250 configured to slide in and out of a stowed position within data storage rack 204. Housing 250 may include a metal (e.g., stainless steel, aluminum, or other metal), plastic, PVC, or any other material suitable for storing data storage cartridges 210 within a data storage rack.

In some examples, each data storage chassis 206 or chassis compartment 207 includes an actuation system including, for example, a motor 242 and a motor controller 243, a chassis or compartment controller 229, and a power distribution unit 230. Chassis or compartment controller 229 communicates with host computing system 202 via high speed (e.g., 5G, millimeter wave, sub-millimeter wave) wireless communication protocols. Chassis or compartment controller 229 may include an antenna (e.g., a 5G, millimeter wave, or sub-millimeter wave antenna) such as 114 of FIG. 1, a transceiver, and other control circuitry to suitably implement high speed wireless communication and to control various operations within data storage chassis 206. In should be noted that, in some embodiments, chassis or compartment controller 229 may not include high speed wireless communication circuity, and a separate wireless communication interface such as 110 of FIG. 1 coupled to chassis or compartment controller 229 may be employed for high speed wireless communication between chassis 206 and host computing system 202. In some embodiments, power distribution unit 230 may receive wired power from an external power source (not shown), and may suitably distribute the received power to different electrical/electronic components of the chassis 206. In other embodiments, the power distribution unit 230 includes a wireless power receiver, which receives power wirelessly from an external source, and distributes the received power to components within the chassis 206. In one embodiment, the wireless power transfer from the external power source may take place according to the qi standard Energy Power Partners (EPP) Power Class 0 that enables a transfer of up to 30 Watts of power. In general, any suitable wireless power transfer technique that provides an adequate amount of power for operation of data storage chassis 206 may be employed in some embodiments.

As noted above, each chassis 206 may include multiple compartments 207. As can be seen in FIG. 2A, each compartment 207 includes at least one movable carriage 220, at least one flexible cable 222, and motor 242 configured to move carriage 220 within housing 250. In the example of FIG. 2A, motors 242 move carriages 220 within housing 250 by propelling carriages 220 along a first axis of stage 240. Examples of motors 242 include a brushless motor, a brushed motor, a direct drive motor, linear motor, servo motor, stepper motor, etc. Stage 240 may include, for example, a rail, a cable pulley, or other track usable to guide movement of carriage 220 relative to housing 250. In some instances, each carriage 220 is disposed between data storage magazines 208 and a bottom surface of housing 250 and traverses stage 240 between data storage magazines 208 and the bottom surface of housing 250.

In some examples, flexible cable 222 communicatively couples carriage 220 to chassis or compartment controller 229. In one example, flexible cable 222 is configured to power and exchange data with carriage 220, and is therefore also coupled to power distribution unit 230. For example, flexible cable 222 may transmit current to operate data storage cartridges 210, couple/de-couple carriage interconnects 213 from drive interconnects 211, or both. While illustrated as a flexible cable, in some examples, carriage 220 communicatively couples to chassis or compartment controller 229 via 5G, millimeter wave or sub-millimeter wave wireless communication, an optical system, microwave system, or other communication system.

In some examples, each carriage 220 is configured to selectively couple to a set of data storage cartridges 210. In other words, each carriage 220 is configured to selectively couple the host computing system 202 to a set of data storage cartridges 210 that are held by a particular data storage magazine 208. Said yet another way, each carriage 220 selectively couples to a single row of data storage cartridges 210 that are all coupled to the same data storage magazine 208. In some examples, the quantity of interconnects 213 on the movable carriage 220 is equal to the number of data storage cartridges 210 that each data storage magazine 208 is configured to hold. For example, each carriage 220 includes a plurality of carriage interconnects 213 that are configured to communicatively couple to a respective drive interconnect 211. In one example, each carriage interconnect 113 couples to a respective drive interconnect 211 of a set of data storage cartridges 210 (e.g., two, three, four, five, or more adjacent data storage cartridges 210) at a particular time to provide parallel (e.g., simultaneous) data access to each of the data storage cartridges 210 in the set (e.g., a set of data storage devices held by a particular data storage magazine 208). In some instances, each carriage 220 operates independently such that each carriage 220 may couple to a different row of data storage cartridges 210. By coupling carriage 220 to a particular set of data storage cartridges 210 held by a single data storage magazine 208, carriage 220 powers (e.g., power-on, power-off, spin-up, spin-down, etc.) that particular set of data storage cartridges 210 without powering all of the data storage cartridges 210 within the chassis 206, which may reduce the amount of energy consumed by data storage cartridges 210. This system-configuration permits the individual data storage cartridges 210 to be individually removed, serviced, and/or replaced without affecting a flow of data to or from any of the other data storage cartridges 210 sharing the same control electronics (e.g., the components on PCB 228). Carriages 220 may each include a plurality of drive controllers 226. For example, data storage cartridges 210 may not include drive controllers to control read/write circuitry of the respective data storage cartridges and may include an interposer that transmits data and signals between the read/write circuitry of data storage cartridges 210 and drive controllers 226 of carriages 220. In the example of FIG. 2A, carriage 220 includes five drive controllers 226 that are each disposed on a respective PCB 228. Carriage 220 may include fewer or additional drive controllers 226. While carriage 220 is illustrated as including drive controllers 226, in some instances, each of data storage cartridge 210 includes drive controllers 226. In such instances, PCBs 228 may represent an interposer that transmits data and commands to/from data storage cartridges 210 and a chassis controller (e.g., a server or rack-level controller).

In operation, the chassis controller 229 transmits data access commands (e.g., read and/or write commands) to carriage 220 via flexible cable 222. The data access commands may specify target logical block addresses (LBA), object name, or file and offset, for executing associated data access operations, depending upon the storage protocol used. Responsive to receiving a data access command, the chassis controller identifies one or more physical data storage cartridges 210 located within chassis 206 that corresponds to the target data using a stored mapping, such as a logical-to-physical block map. The chassis controller 229 outputs a signal (through a wired connection or wirelessly (e.g., using 5G, millimeter wave or sum-millimeter wave wireless communication)) to cause motor 242 to robotically propel carriage 220 across stage 240 to a particular position suitable for accessing the identified data storage cartridges 210.

Carriage 220 couples to a set of data storage cartridges 210 (e.g., a row of data storage cartridges 210 attached to a particular data storage magazine 208) when carriage 220 reaches the particular position. In some examples, carriage 220 lifts carriage interconnects 113 towards drive interconnects 211 to communicatively couple the set of data storage devices 210 to carriage 220.

In some examples, the chassis controller 229 outputs the data access commands to one or more drive controllers 226. Drive controllers 226 may receive the data access commands and may control the read/write circuitry of the set of data storage cartridges 210 in response to receiving the data access commands.

In accordance with techniques of this disclosure, a movable carriage may selectively couple a set of data storage devices to a host computing system. Selectively coupling a set of the data storage devices stored within a chassis may enable some of the data storage devices to be powered down or in a low powered state, which may reduce the amount of energy consumed by the data storage devices. Utilizing a movable carriage may enable a host computing system to access data storage devices relatively quickly compared to offline data storage systems, which may increase read and write operations.

Additionally, as described above, 5G or other high speed wireless communication and/or wireless power may be employed. As noted above, wireless power transfer may take place according to the qi standard EPP Power Class 0 that enables a transfer of up to 30 W of power. This 5G or other high speed wireless communication and/or wireless power may substantially reduce/eliminate cabling, and thereby reduce cost and complexity.

Figure 2B:
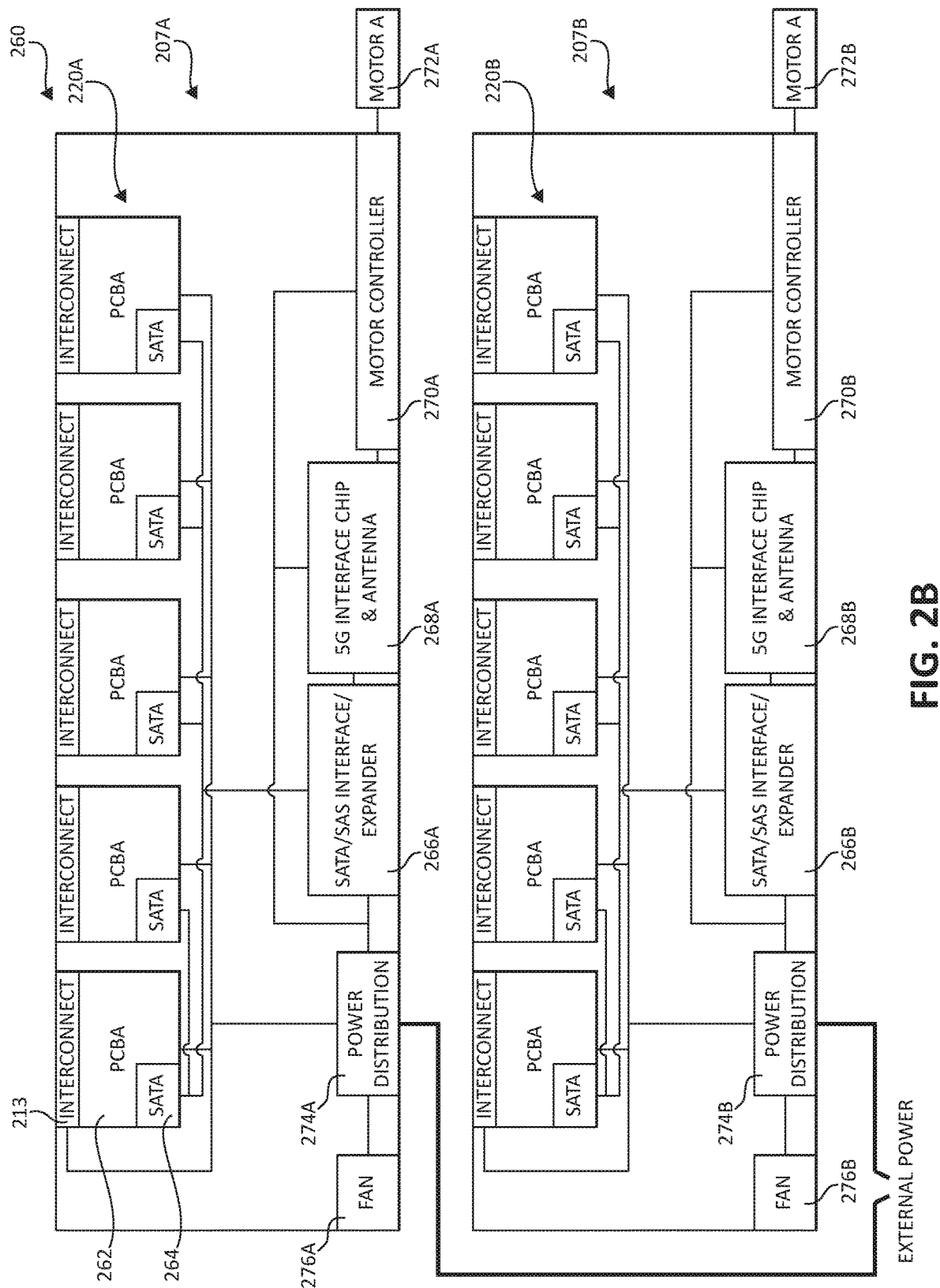
FIG. 2B is a simplified block diagram of a data storage chassis in accordance with another embodiment.

FIG. 2B is a simplified block diagram of a data storage chassis 260 in accordance with another embodiment. A number of elements of data storage chassis 260 of FIG. 2B are similar to those included in data storage chassis 206 of FIG. 2A, and a description of those elements is not repeated in the interest of brevity.

In FIG. 2B, compartment 207B is shown below compartment 207A. However, compartments 207A and 207B may be side-by-side in chassis 260. Each compartment 207 of chassis 260 includes printed circuit board assemblies (PCBAs) 262, with each PCBA including a carriage interconnect 213 that is configured to couple to a drive interconnect such as 211 (of FIG. 2A). In the interest of simplification, magazines with data storage cartridges are not shown in FIG. 2B. Also, elements such as drive controllers, which are a part of the PCBA 262, are not shown in the interest of simplification. Communication of data to/from each PCBA 262 is carried out via SATA, SAS, PCIe or any other suitable bus interfaces 264. Each individual bus interface 264 is coupled to a compartment bus interface (e.g., SATA, PCIe, or SAS interface/expander) 266A, 266B. Additional parallel expanders (not shown) may be used for redundancy and may be coupled to additional ports on PCBAs 262 (not shown). Each compartment bus interface 266A, 266B is coupled to a chassis compartment controller 268A, 268B, which is employed to provide 5G wireless (or wireless millimeter/sub-millimeter wave) communication between chassis 206 and a host computing system such as 202 (of FIG. 2A). Further, each chassis compartment controller 268A, 268B provides commands to a motor controller 270A, 270B, which may responsively direct motors 272A, 272B to suitably move carriages 220A, 220B. Each compartment 207A, 207B also includes a power distribution component 274A, 274B which is connected to different components of each compartment 207A, 207B in a manner shown in FIG. 2B to supply them with power. In some embodiments, each power distribution unit 274A, 274B may receive wired power from an external power source (not shown), and may suitably distribute the received power to different electrical/electronic components of each compartment 207A, 207B. In other embodiments, each power distribution unit 274A, 274B includes a wireless power receiver, which receives power wirelessly from an external source, and distributes the received power to components within each compartment 207A, 207B. In some embodiments, each compartment 207A, 207B may include one or more fans 276A, 276B which receives power from corresponding power distribution unit 274A, 274B.

FIG. 2C is a simplified block diagram of a data storage chassis 280 in accordance with another embodiment. In data storage chassis 280, control elements are included on a separate element/board (e.g., a separate PCB) 282, and the remaining elements are located in a manner similar to the arrangement shown in data storage chassis 260 of FIG. 2B. A description of similar elements is not repeated in the interest of brevity.

As can be seen in FIG. 2C, PCB 282 includes a common bus interface and controller 284, which is coupled to the compartment bus interfaces 266A and 266B, and to a wireless interface controller and antenna 286. It should be noted that, in the embodiment of FIG. 2C, control functions for the chassis 280 are carried out by common bus interface and controller 284, and the wireless interface controller and antenna 286 handles wireless communication between the chassis 280 and a host. In an alternate embodiment, some or all of the chassis 280 control functions may be carried out by element 286. In the embodiment of FIG. 2C, common bus interface and controller 284 provides movement control commands to a common motor controller 288, which may responsively direct motors 272A, 272B to suitably move carriages 220A, 220B. Each compartment 207A, 207B includes a motor control feedback circuit 290A, 290B, which detects positions of carriages 220A, 220B and provides the detected positions to common motor controller 288, which accordingly controls the operation of motors 272A and 272B.

In addition to each compartment 207A, 207B including a power distribution component 274A and 274B, chassis 280 includes a common power distribution unit 292 that receives wired or wireless power from an external power source, and provides the received power to the compartment-level power distribution components 274A and 274B for further distribution to individual components withing the respective compartments 207A, 207B. As can be seen in FIG. 2C, common power distribution component 292 also provides power to elements 284, 286 and 288, and to a fan 294.

Is should be noted that the above description of the embodiments of FIGS. 2A, 2B and 2C primarily describes wired (electrical or optical) communication within the chassis 206, 260 and 280. However, in some embodiments, individual PCBs/PCBAs 228/262 may include 5G, wireless millimeter wave or wireless sub-millimeter wave control circuitry and antennas of the type shown in FIG. 1, for example, which allow for 5G, millimeter wave or sub-millimeter wave wireless communication within the chassis, thereby further eliminating cabling.

Figure 3:
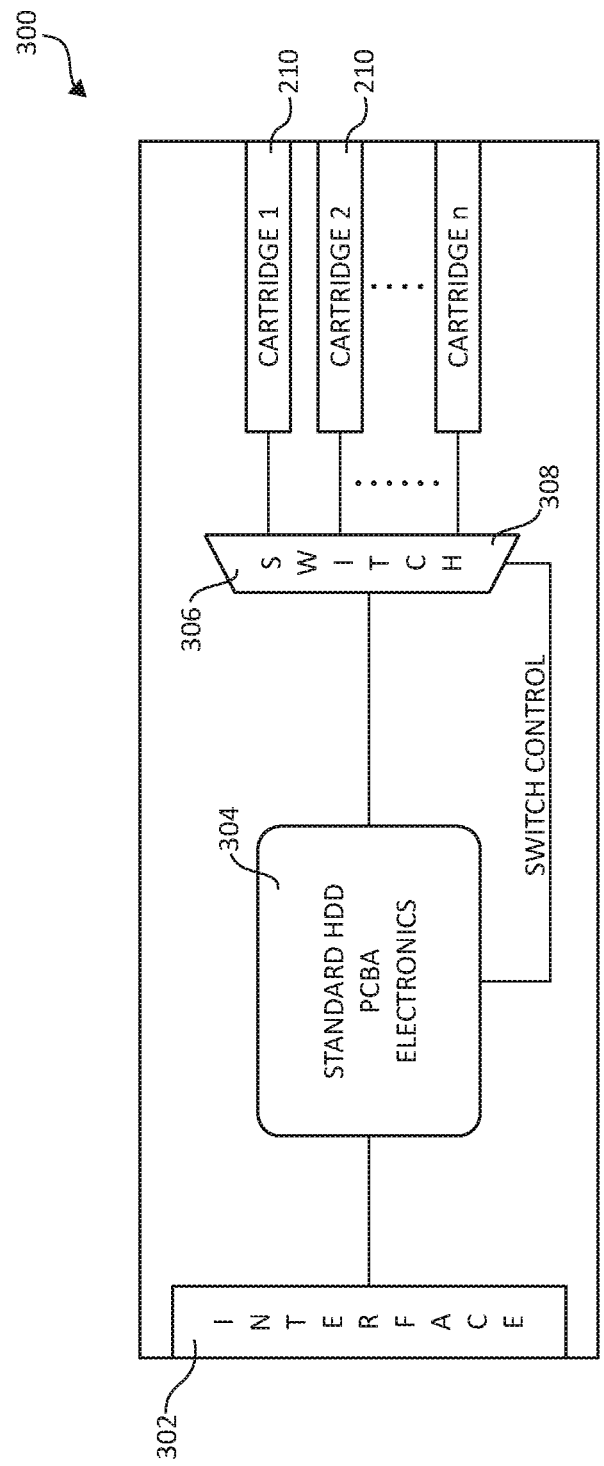
FIG. 3 is a simplified block diagram showing a data storage chassis without a moveable carriage in accordance with one embodiment.

FIG. 3 is a simplified block diagram showing a data storage chassis 300 without a moveable carriage in accordance with one embodiment. Chassis 300 includes a wireless communication interface 302, which may include an antenna (e.g., a 5G, millimeter wave, or sub-millimeter wave phased array antenna) and a wireless interface controller. The antenna and wireless interface controller, which are not separately shown, may be similar to those shown in FIG. 1 and described above. The wireless communication interface 302 is connected to PCBA electronics (or read/write control and power electronics) 304, which may include one or more drive controllers and other circuitry that are not shown and described in the interest of simplification. Data storage chassis 300 further includes a plurality of data storage cartridges 210 that are couplable to PCBA electronics 304 via a switch (e.g., a multiplexor) 306. Control circuitry within PCBA electronics 304 together with switch 306 selectively couple one or more data storage cartridges 210 for storage and/retrieval of host data communicated to/from chassis 300 via 5G interface 302.

In at least some of the above-described embodiments, data security may be enhanced by isolating data storage media from control components by a physical or conceptual "air gap." Examples of physical air gap between data storage media and control circuitry are seen in the embodiments of FIGS. 2A-2C. As described above in connection with FIGS. 2A-2C, the data storage media are within data storage cartridges 210 and the control circuitry (e.g., drive controllers) are on moveable carriages 220. The connection and disconnection of control circuitry to data storage cartridges are described below in connection with FIGS. 4A and 4B.

Figure 4A:
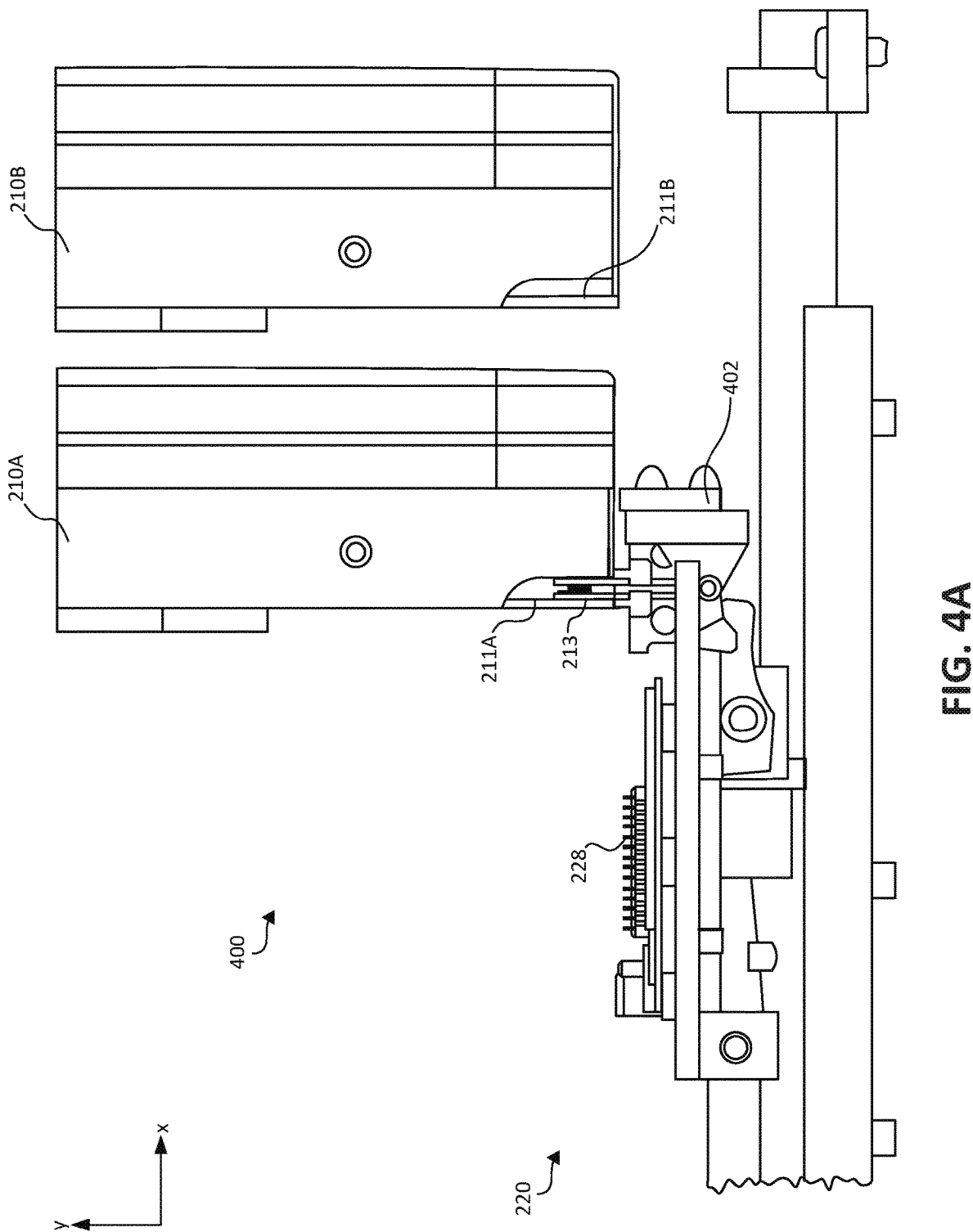
FIGS. 4A and 4B are block diagrams that represent side views of a data storage chassis including a movable carriage in accordance with one embodiment.
Figure 4B:
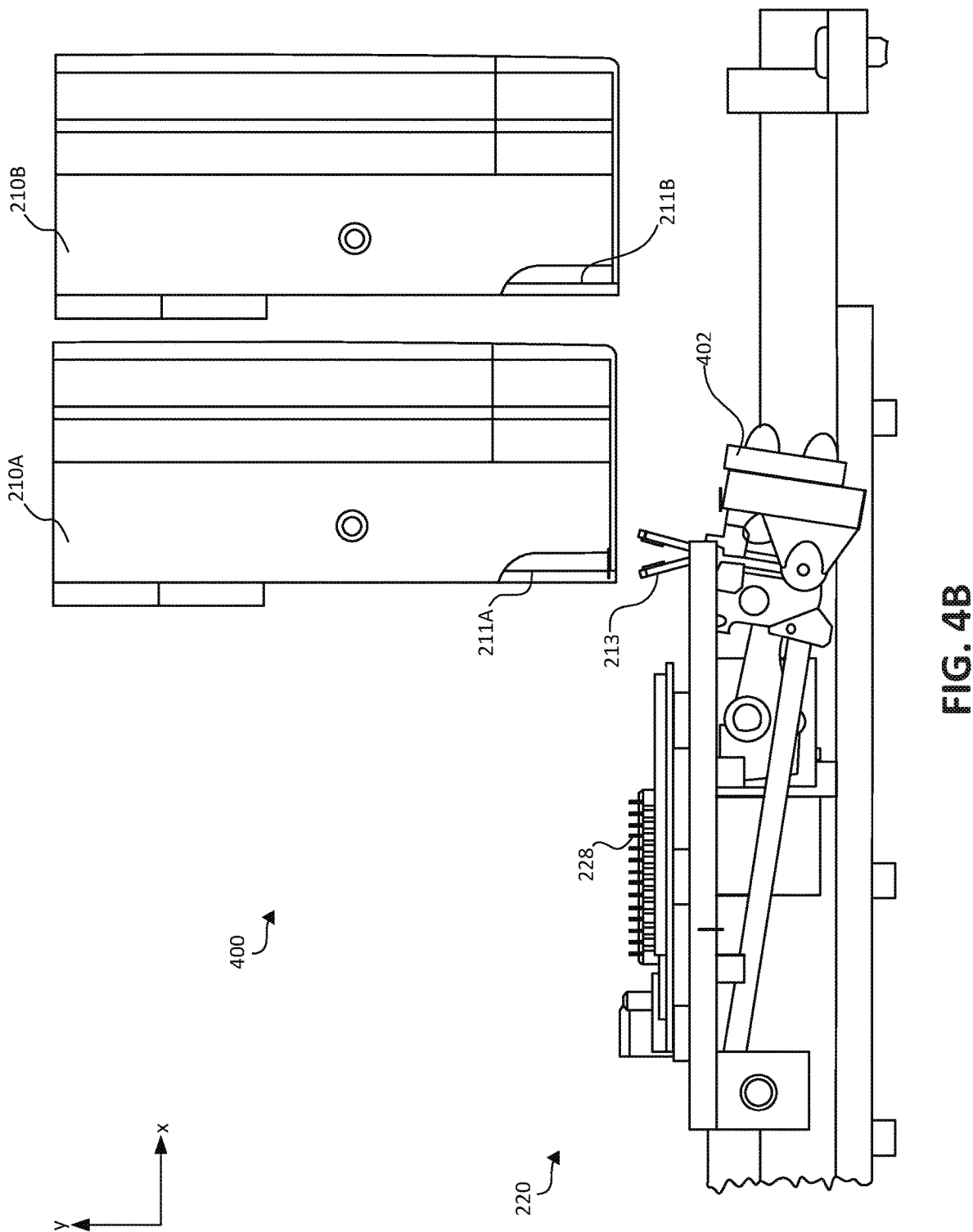

FIGS. 4A and 4B represent side views of a data storage chassis 400 including a movable carriage in accordance with one embodiment. Data storage chassis 400 includes data storage cartridges 210A and 210B, and movable carriage 220 (also referred to as carriage 220) that is capable of horizontal (x-axis) and vertical (y-axis) movement. Data storage cartridges 210A and 210B (collectively, data storage cartridges 210) include respective drive interconnects 211A and 211B (collectively, drive interconnects 211). Data storage cartridge 210A may be installed in a first magazine (not shown in FIGS. 4A and 4B), and data storage cartridge 210B may be installed in a second magazine (not shown in FIGS. 4A and 4B). As noted earlier, each data storage cartridge 210 includes data storage media that are capable of storing user data.

Carriage 220 includes PCBs 228 with one or more drive controllers (not shown in FIGS. 4A and 4B) and one or more memories (not shown in FIGS. 4A and 4B) that store firmware that is executed by the drive controllers to manage read and write operation to the data storage media in the data storage cartridges 210. Carriage 220 includes carriage interconnects 213 that are configured to couple to drive interconnects 211.

FIG. 4A represents carriage interconnects 213 in an "up" or "engaged" position. When carriage interconnects 213 are in the engaged position, carriage interconnects 213 communicatively and mechanically couple to drive interconnects 211A which allows data access operations (e.g., writing or reading of data) at data storage cartridge 210A. In some instances, carriage interconnects 213 are configured to open and close. In such instances, carriage interconnects 213 may close and clamp onto drive interconnects 211A when carriage interconnects 213 are in the engaged position. For instance, carriage interconnects 213 may include a shaped memory alloy (SMA) that opens carriage interconnects 213 in response to receiving an electrical current and closes carriage interconnects 213 in the absence of an electrical current.

In the engaged position shown in FIG. 4A, and when the host is transmitting/receiving data through 5G, wireless millimeter wave, or wireless sub-millimeter wave communication with data storage chassis 400, unauthorized access to the host or data storage chassis 400 may be detected. Upon the detection of the unauthorized access, a chassis controller (not shown in FIGS. 5A and 5B) may place the chassis 400 in a "security comprised" state, and send a disengage signal to carriage 220, which responsively disconnects the carriage interconnects 213 from the drive interconnects 211A and enables a manual reset feature 402. With the reset feature 402 enabled, no read/write activity can be resumed until the reset feature 402 is physically disabled (e.g., a physical button is pressed). This protects any data stored in the data storage cartridges 210A. Also, in the security compromised state, the carriage 220 cannot be moved to data storage cartridge 210B to carry out data access operations on that cartridge. The disengaged or disconnected state is shown in FIG. 4B.

Air gap security may also be conceptually applied to data storage chassis 300 of FIG. 3. Referring now to FIG. 3, when the host is transmitting/receiving data through 5G, wireless millimeter wave, or wireless sub-millimeter wave communication with data storage chassis 300, unauthorized access to the host or data storage chassis 300 may be detected. Upon such detection, PCBA electronics 304 may place the chassis 300 in a "security comprised" state, which may involve placing switch 306 in a state that disconnects all data storage cartridges 210 from PCBA electronics 304, and enabling a reset feature 308. With the reset feature 308 enabled, no read/write activity can be resumed until the reset feature 308 is physically disabled (e.g., a physical button is pressed). This protects any data stored in the data storage cartridges 210.

Figure 5A:
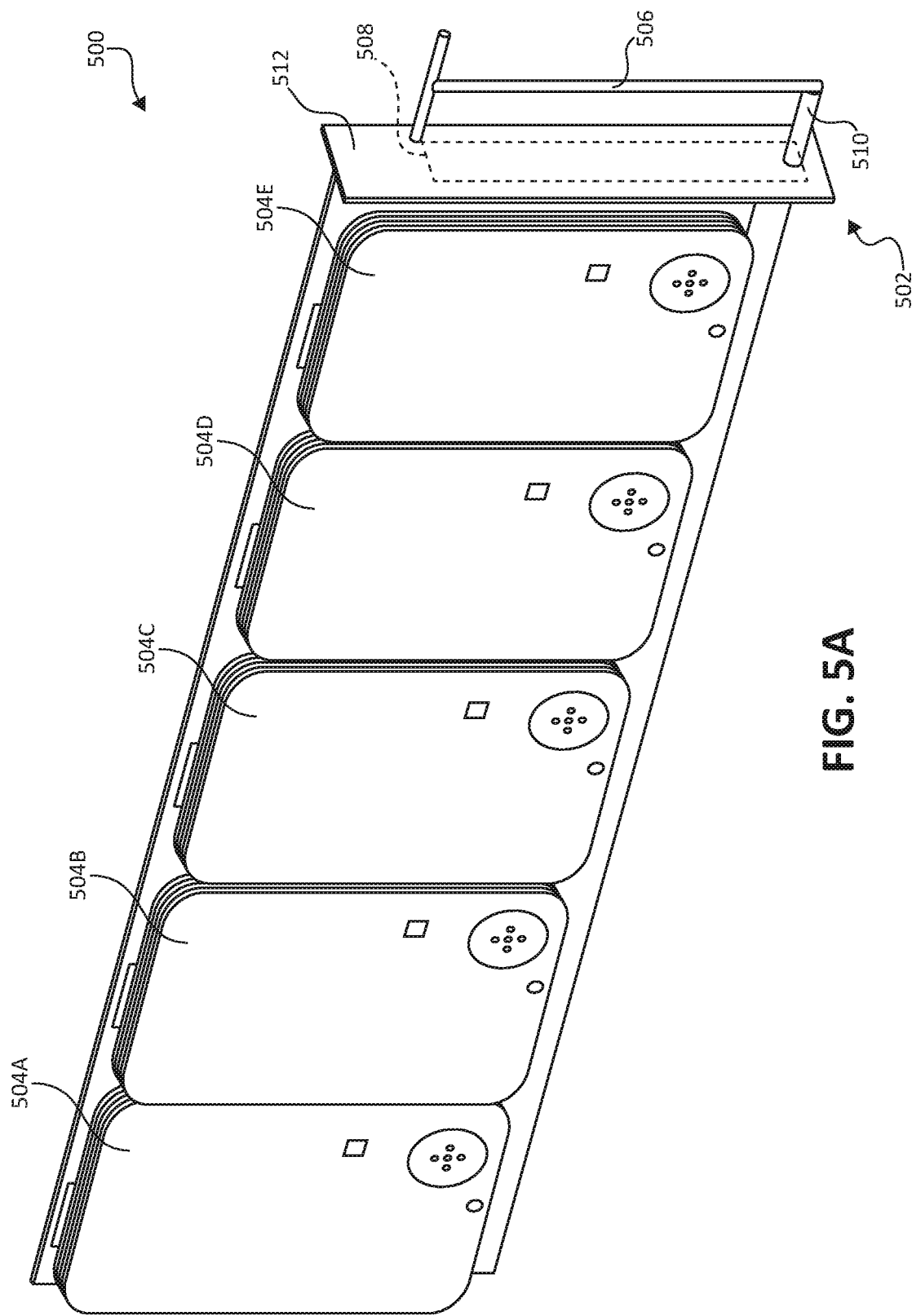
FIG. 5A is a diagrammatic illustration of a data storage magazine including multiple data storage devices and a common wireless interface in accordance with one embodiment.

FIG. 5A is a diagrammatic illustration of a data storage magazine 500 including multiple data storage devices and a common wireless interface 502 in accordance with one embodiment. In the embodiment of FIG. 5A, data storage magazine 500 includes 5 data storage devices 504A-504E. However, in alternate embodiments, the number of data storage devices included in data storage magazine 500 may be less than 5 or greater than 5. Each of data storage devices 504A-504E may be a data storage device such as 100 of FIG. 1. However, in some embodiments, each of data storage devices 504A-504E may not include an internal wireless interface of the type shown in FIG. 1. Instead, each of data storage devices 504A-504E may include a wired interface (not shown) that is connected to common wireless interface 502, which wirelessly communicates data between an external host (not show in FIG. 5A) and each of data storage devices 504A-504E.

In some embodiments, common wireless interface 502 may include an antenna (e.g., a 5G, millimeter wave, or sub-millimeter wave antenna) 506 and a wireless interface controller 508. As can be seen in FIG. 5A, the antenna 506 is positioned at an end of the data storage magazine 500. This may prevent shielding from adjacent devices when, for example, data storage magazine 500 is installed in a system that includes a plurality of data storage magazines and/or other devices. In the embodiment of FIG. 5A, antenna 506 is a dipole antenna that is rotatably mounted on a fastener (e.g., a screw) 510, which is attached (e.g., removably attached) to a side or backplane 512 of a chassis (e.g., similar to chassis 206A of FIG. 2A). It should be noted that, in addition to being able to rotate about fastener 510, antenna 506 may also be able to rotate towards and away from side or backplane 512. This allows for suitably adjusting the antenna 506 for signal tuning. In general, any suitable antenna may be utilized. In some embodiments, wireless interface controller 508 may include a transceiver circuit and any other suitable interface circuitry that is communicatively coupled to antenna 506. Data storage devices 504A-504E may operate in a manner similar to the data storage devices described above, and therefore operational details are not repeated in the interest of brevity.

Figure 5B:
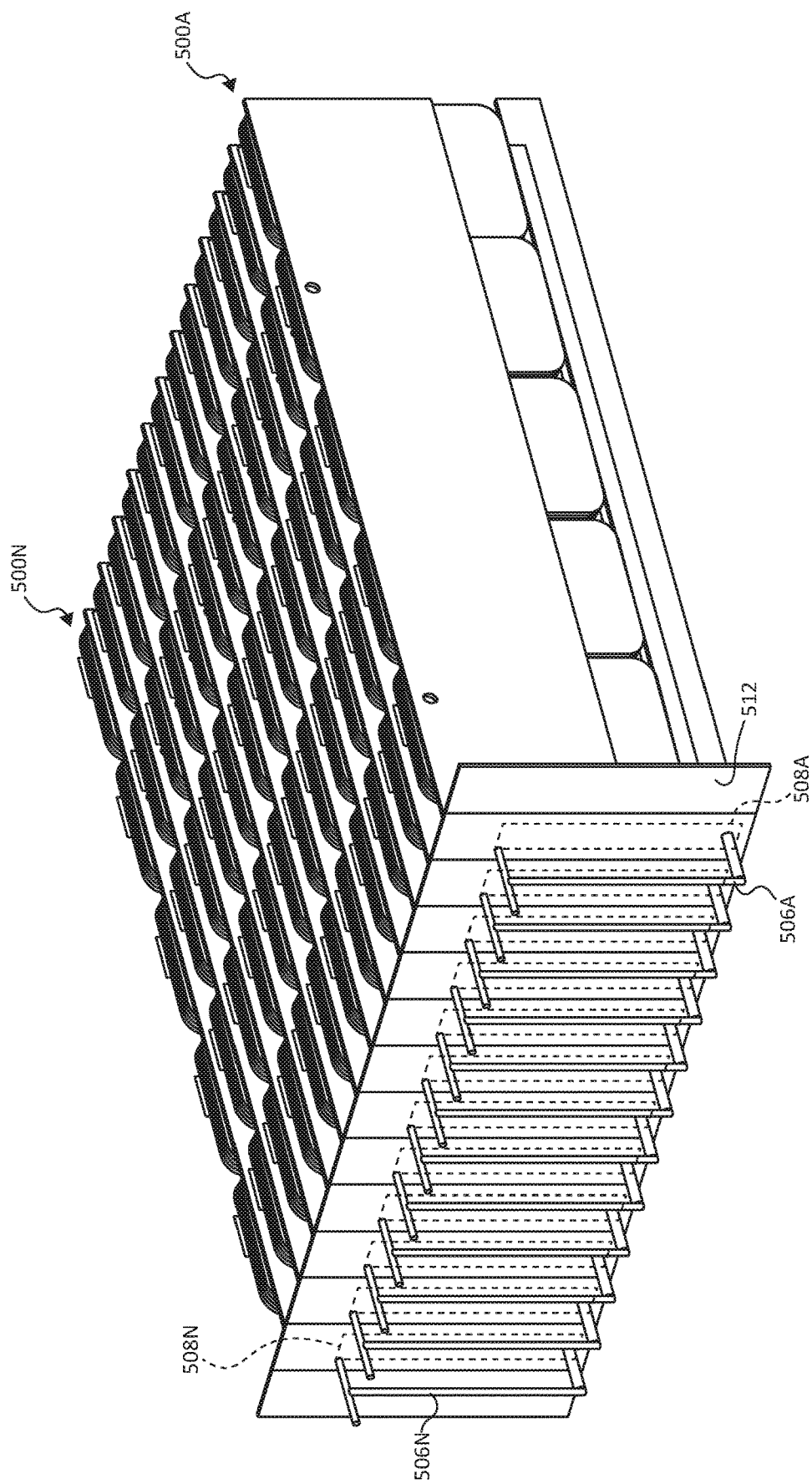
FIG. 5B is a perspective view of a chassis portion including a plurality of data storage magazines of the type shown in FIG. 5A.

FIG. 5B is a perspective view of a chassis portion including a plurality of data storage magazines 500A-500N of the type described above in connection with FIG. 5A. The chassis portion may include a plurality of wireless interface controllers 508A-508N, with each different one of the plurality of wireless interface controllers 508A-508N associated with (or included in) a corresponding different one of the plurality of data storage magazines 500A-500N. Similarly, the chassis portion of FIG. 5B may include a plurality of antennas 506A-506N (e.g., a 5G, millimeter wave, or sub-millimeter wave antenna), with each different one of the plurality of antennas 506A-506N associated with (or included in) a corresponding different one of the plurality of data storage magazines 500A-500N. Individual ones of antennas 506A-506N may be similar to antenna 506 described above in connection with FIG. 5A. Also, positions of individual ones of antennas 506A-506N may be rotated and adjusted relative to chassis side or backplane 512 in a manner described above in connection with FIG. 5A. Further, individual ones of wireless interface controllers 508A-508N may be similar to wireless interface controller 508 described above in connection with FIG. 5A. In some embodiments, each different antenna-controller combination (e.g., 506A, 508A, . . . 506N, 508N) operates independently. In alternate embodiments, wireless interface controllers 508A-508N may be coupled or otherwise integrated, and antennas 506A-506N may be operated together or in conjunction with one another using signal modulation to improve signal directionality and data communication between the chassis and an external host (not show in FIG. 5A).

Figure 5C:
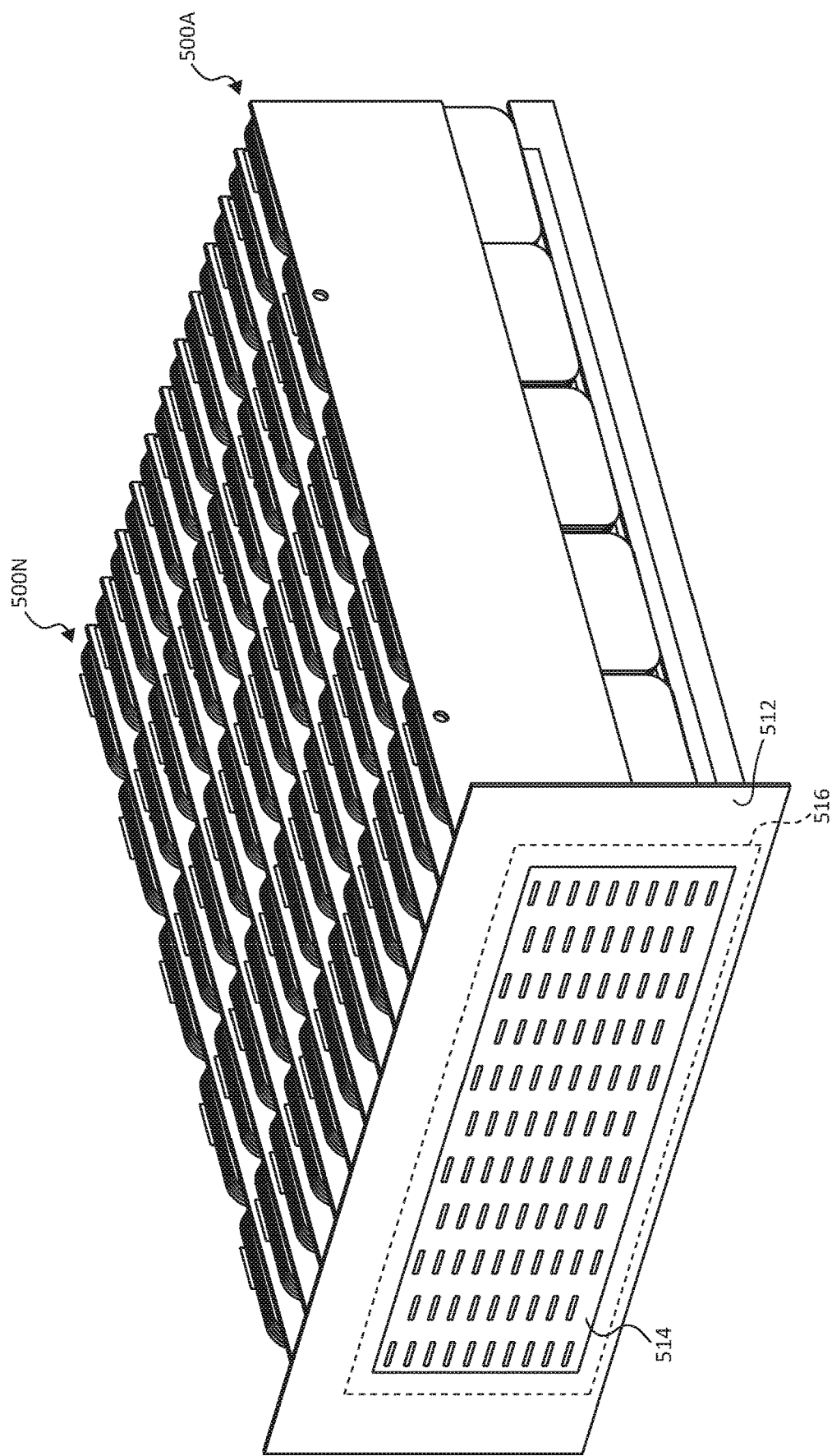
FIG. 5C is a perspective view of a chassis portion including a plurality of data storage magazines, and a phased array antenna.

FIG. 5C is a perspective view of a chassis portion including a plurality of data storage magazines 500A-500N, and a phased array antenna 514 (e.g., a 5G, millimeter wave, or sub-millimeter wave phased array antenna) instead of the dipole antennas 506A-506N included in the embodiments of FIG. 5B. The embodiment of FIG. 5B may employ a single wireless interface controller 516 that is common to all data storage magazines 500A-500N, and that, together with phased array antenna 514, provides a high-speed wireless interface between data storage magazines 500A-500N and an external host (not show in FIG. 5A). Phased array antenna 514 may employ signal modulation to carry out the wireless communication. Other details of the chassis are not provided in the interest of brevity.

Figure 6:
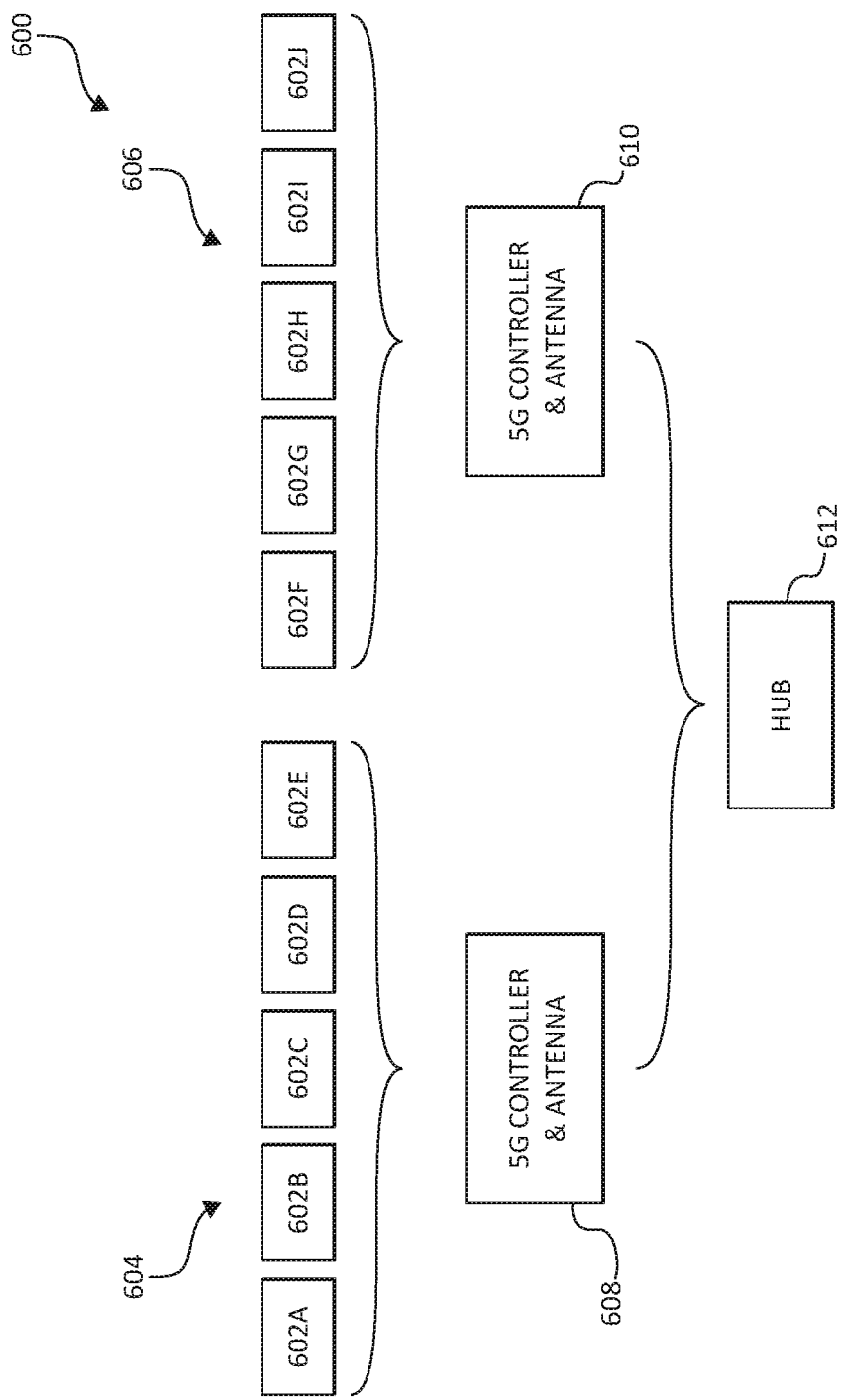
FIG. 6 is a diagrammatic illustration of a system of data storage throughput management in accordance with one embodiment.

FIG. 6 is a diagrammatic illustration of a system 600 of data storage throughput management in accordance with one embodiment. System 600 includes a plurality of data storage devices 602A-602J, which are divided into groups (e.g., a first group 604 including devices 602A-602E, and a second group 606 including device 602F-602J), with each group being connected to a different wireless communication interface 608, 610. Each wireless interface 608, 610 may include an antenna (e.g., a 5G, millimeter wave, or sub-millimeter wave antenna), a transceiver and other suitable control circuitry. In FIG. 6, 5 data storage devices 602A-602E, 602F-602J are connected to each wireless interface 608, 610. However, in alternate embodiments, the number of data storage devices included in each group may be less than 5 or greater than 5. In general, a total number of data storage devices, a number of data storage devices in each group and a number of wireless interfaces may vary in different embodiments. An example equation for determining a number of data storage devices (N) per wireless interface or antenna is included below:

$$N = \text{rounddown}((\text{MinimumStandardDataRate} * \text{LossFactor})/(\text{MediaMaxThroughput})) \quad \text{Equation 1}$$

A first example using Equation 1 is as follows:

Millimeter wave 5G MinimumStandardDataRate=1.5 gigabits per second (Gbps)

Example 4 terabyte (TB) HDD=180 megabytes per second (MB/s)=180*8 megabits per second (Mbps)=1440 Mbps=1.44 Gbps (MediaMaxThroughput)

LossFactor=0.98

Therefore, N=1.

A second example using Equation 1 is as follows:

IEEE802.11ax MinimumStandardDataRate=10 Gbps

Example 4 terabyte TB HDD=180 MB/s=180*8 Mbps=1440 Mbps=1.44 Gbps (MediaMaxThroughput)

LossFactor=0.98

Therefore, N=6.

As indicated above, the number of data storage devices in each group 604, 606 may be selected based on data storage throughput. Thus, in some embodiments, a sum of the throughputs of the data storage devices 602A-602E, 602F-602J in a group corresponds to (or matches) a throughput capability of the corresponding wireless communication interface 608, 610. Thus, data communication between the data storage device group 602A-602E, 602F-602J and the respective wireless communication interface 608, 610 can take place without negatively impacting the throughputs of individual ones of the data storage devices 602A-602J. Element 612 is a hub or base station, which is communicatively coupled to the wireless communication interfaces 608 and 610. In some embodiments, a throughput of hub 612 is greater than a throughput of each wireless communication interfaces 608, 610. Hub 612 may be at a location that is spaced apart from the location of data storage devices 602A-602J and interfaces 608 and 610.

Figure 7:
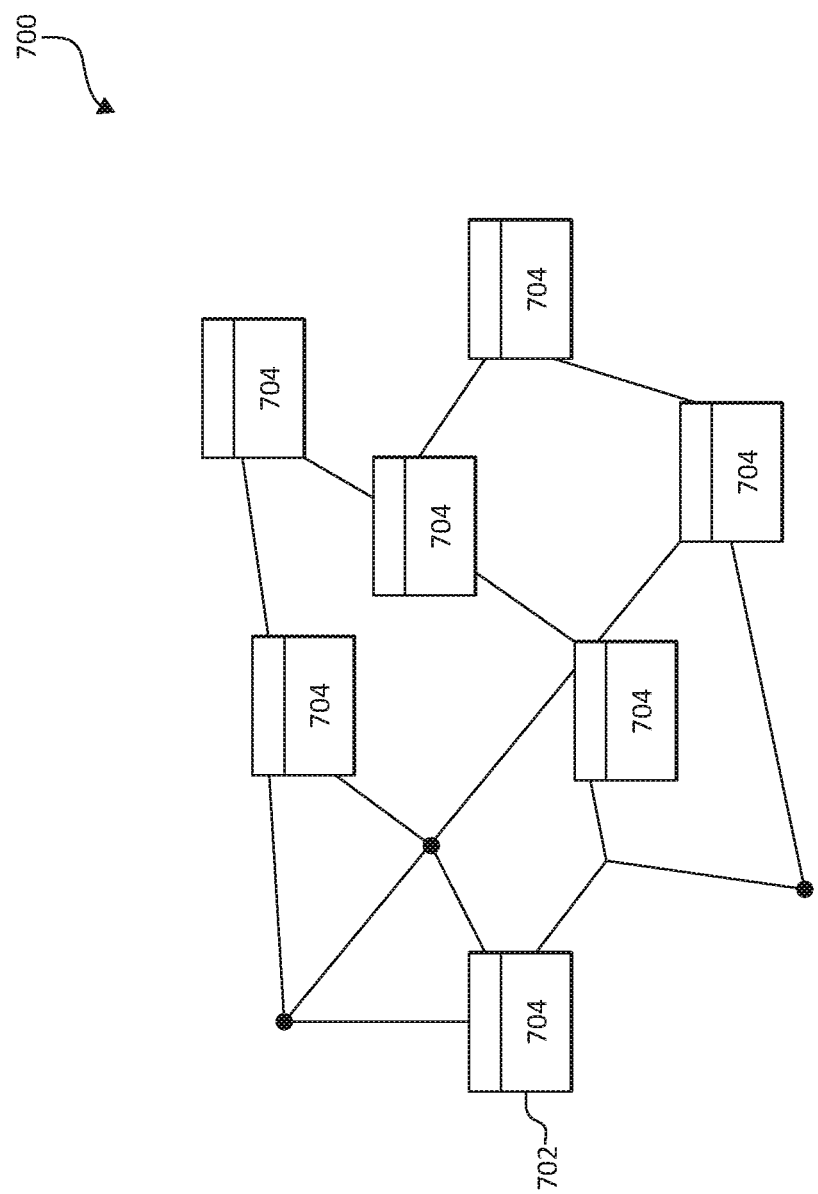
FIG. 7 is a diagrammatic illustration of a high speed wireless network including a plurality of devices that are configured to wirelessly communicate with each other in accordance with one embodiment.

FIG. 7 is a diagrammatic illustration of a 5G, wireless millimeter wave, or wireless sub-millimeter wave network 700 including a plurality of devices 702 that are configured to communicate with each other. Each of devices 702 includes a wireless communication interface 704 that may include an antenna (e.g., a 5G, millimeter wave, or sub-millimeter wave antenna) and a wireless interface controller of the type described above in connection with FIG. 1. In one embodiment, devices 702 are data storage devices that form a data storage mesh. In an alternate embodiment, one or more of devices 702 may not be data storage devices. By using 5G, wireless millimeter wave, or wireless sub-millimeter wave communication, device 702 data transfer speeds are high and cabling between devices 702 is eliminated.

It should be noted that, in different embodiments described above, wireless communication interfaces and their wireless interface controllers facilitate wireless communication of data between a data storage device or data storage chassis and a host using at least one frequency in a range of frequencies including fifth-generation (5G), millimeter, and sub-millimeter frequency ranges.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular embodiment or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments include more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage chassis comprising:
    a plurality of data storage cartridges;
    a plurality of printed circuit board assemblies (PCBAs) that are detachably connectable to different subsets of the plurality of data storage cartridges by operation of a motor; and
    a wireless interface controller communicatively coupled to the plurality of PCBAs, and communicatively coupled to a motor controller that is configured to activate the motor, the wireless interface controller configured to provide the motor controller with movement control commands that cause the motor controller to responsively activate the motor to move the plurality of PCBAs in one or more directions dictated by the movement control commands, the wireless interface controller facilitating wireless communication of data between the data storage chassis and a host using at least one frequency in a range of frequencies including fifth-generation (5G), millimeter, and sub-millimeter frequency ranges.

2. The data storage chassis of claim 1 and wherein at least some of the plurality of data storage cartridges comprise data storage discs.

3. The data storage chassis of claim 1 and wherein at least some of the plurality of data storage cartridges comprise solid state memory.

4. The data storage chassis of claim 1 and wherein the wireless interface controller is chassis-level controller communicatively coupled to all of the plurality of PCBAs, or the wireless interface controller is one of a plurality of wireless interface controller controllers, with each different one of the plurality of wireless interface controller controllers being connected to a different subset of the plurality of PCBAs.

5. The data storage chassis of claim 1 and wherein the plurality of data storage cartridges, and the plurality of PCBAs that are detachably connectable to different subsets of the plurality of data storage cartridges by operation of the motor, are within a first one of a plurality of compartments of the data storage chassis, and wherein the wireless interface controller is a compartment-level controller for the first one of the plurality of compartments.

6. The data storage chassis of claim 1 and further comprising a power distribution circuit configured to receive wireless power from a power source external to the data storage chassis.

7. The data storage chassis of claim 1 and wherein the wireless interface controller is further configured to detect unauthorized access to the data storage chassis and, when one of the different subsets of the plurality of data storage cartridges is connected to the plurality of PCBAs during the unauthorized access, direct a carriage on which the plurality of PCBAs are mounted to disconnect the plurality of PCBAs from the subset of the plurality of data storage cartridges.

\* \* \* \* \*